March 10, 1959 H. A. SHERWOOD 2,877,020

TONE ARM STRUCTURE FOR SOUND EQUIPMENT

Filed Dec. 12, 1956

INVENTOR.
Henry A. Sherwood
BY
Munn, Liddy & March
ATTORNEYS 2,877,020

TONE ARM STRUCTURE FOR SOUND EQUIPMENT

Henry A. Sherwood, Millburn, N. J., assignor to Infra Electronics Corporation, Cedar Grove, N. J., a corporation of New York Application December 12, 1956, Serial No. 627,801

12 Claims. (Cl. 274—23)

This invention relates to sound equipment such as sound recording and reproducing machines, business dictating machines and the like.

The invention concerns improvements in the dictating machines described and claimed in my copending applications Serial No. 253,129, now Patent No. 2,858,135 filed October 25, 1951 and entitled Sound Recording And Reproducing Apparatus, and Serial No. 540,404 filed October 14, 1955 and now abandoned and entitled Dictating Machine. However, the invention is not to be considered as limited to business dictating machines, since it has utility in connection with all types of sound equipment wherein there is traversal of a record medium by a tone arm, either for purposes of recording or reproducing.

In a business dictation machine, one of the most important functions is to obtain good tracking of the stylus during the playback operation. Usually, in such a machine, a tone arm is pivoted about a fixed point and carries a laterally movable cartridge which is biased so as to accommodate eccentric records. With such organization, the tone arm is subjected to tangential forces of different magnitude during its sweep or travel from the peripheral portion of a record disk to the central portion thereof. This type of organization sometimes results in poor tracking of the stylus and an unduly-often repetition of the last-played groove of the record, when playback is employed. I have found that the tangential forces above mentioned have a tendency to move the transducer cartridge laterally toward either one side or the other of the tone arm, depending on the position of the cartridge and the general geometric arrangement of the various components involved.

The above disadvantages and drawbacks encountered in prior sound equipment are obviated by the present invention, by the provision of a novel and improved tone arm and stylus-carrying cartridge organization wherein different angular positions of the stylus laterally with respect to the tone arm may be readily obtained. I have found that with such organization it is possible to counteract the above-stated tangential forces and thereby to greatly improve the tracking of the stylus.

Accordingly, one object of the invention is to provide a novel and improved tone arm and cartridge organization wherein there is counteracted the said tangential forces operating on the tone arm, so as to obtain repeatedly accurate tracking at all times during playback.

A further object of the invention is to provide a novel and improved tone arm and stylus-carrying cartridge organization wherein different angles of the stylus laterally with respect to the tone arm may be obtained, thereby to counteract tangential forces on the tone arm and greatly improve the tracking of the stylus.

In accomplishing the above objects I provide, in the specific embodiment of the invention illustrated herein, a novel means for adjustably mounting the cartridge on the tone arm in a manner to enable it to have different adjusted positions wherein the stylus is presented at the said different lateral angles with respect to said arm.

In my copending application Serial No. 253,129 above referred to, there is disclosed a knife-edge mounting of the transducer cartridge, by which certain advantages and features are obtained. In accordance with the present invention I am able to obtain the same advantages in mounting the cartridge, but with a more economical construction costing less to produce, and one which provides for a greater degree of stability and uniformity in performance. This improved mounting is utilized in conjunction with the mounting by which different angular positions are obtainable, and both mountings comprise in their simplest forms a sturdy pivot or swivel member which may be locked in different angular positions and which directly carries a short, rugged leaf spring providing for lateral compliance of the cartridge while limiting cartridge movement in directions other than broadside to the said leaf spring.

A further object of the invention is to provide an improved tone arm and cartridge organization as above characterized, having in conjunction with the adjustable angular mounting, a means for effecting lateral shifting and locking or clamping of the cartridge for purposes of recording or dictating, such means being operable despite various different angular positions of the stylus and cartridge.

A still further object of the invention is to provide a novel and improved tone arm and cartridge organization in accordance with the foregoing, wherein there is incorporated means for effecting a limited lateral adjustment of the mounting means which provides the different angular positions of the stylus, thereby to enable initial correct positioning and functioning of the tone arm and cartridge to be easily and quickly effected; and to provide in conjunction with this an adjustable lateral stop utilized in the clamping of the cartridge during recording.

Other objects of the invention reside in the provision of novel adjustment means for various components, including springs, in the present improved tone arm and cartridge organization, whereby correct functioning of the same is initially quickly obtained.

A feature of the invention resides in the provision of an improved tone arm and cartridge structure having all of the above attributes and advantages and which is nevertheless extremely simple in its construction, reliable in operation and economical to fabricate.

Other features and advantages will hereinafter appear.

In the drawings accompanying this specification, similar characters of reference indicate corresponding parts wherever possible in the several views, in which.

Figures 1, 2, 3, 4:
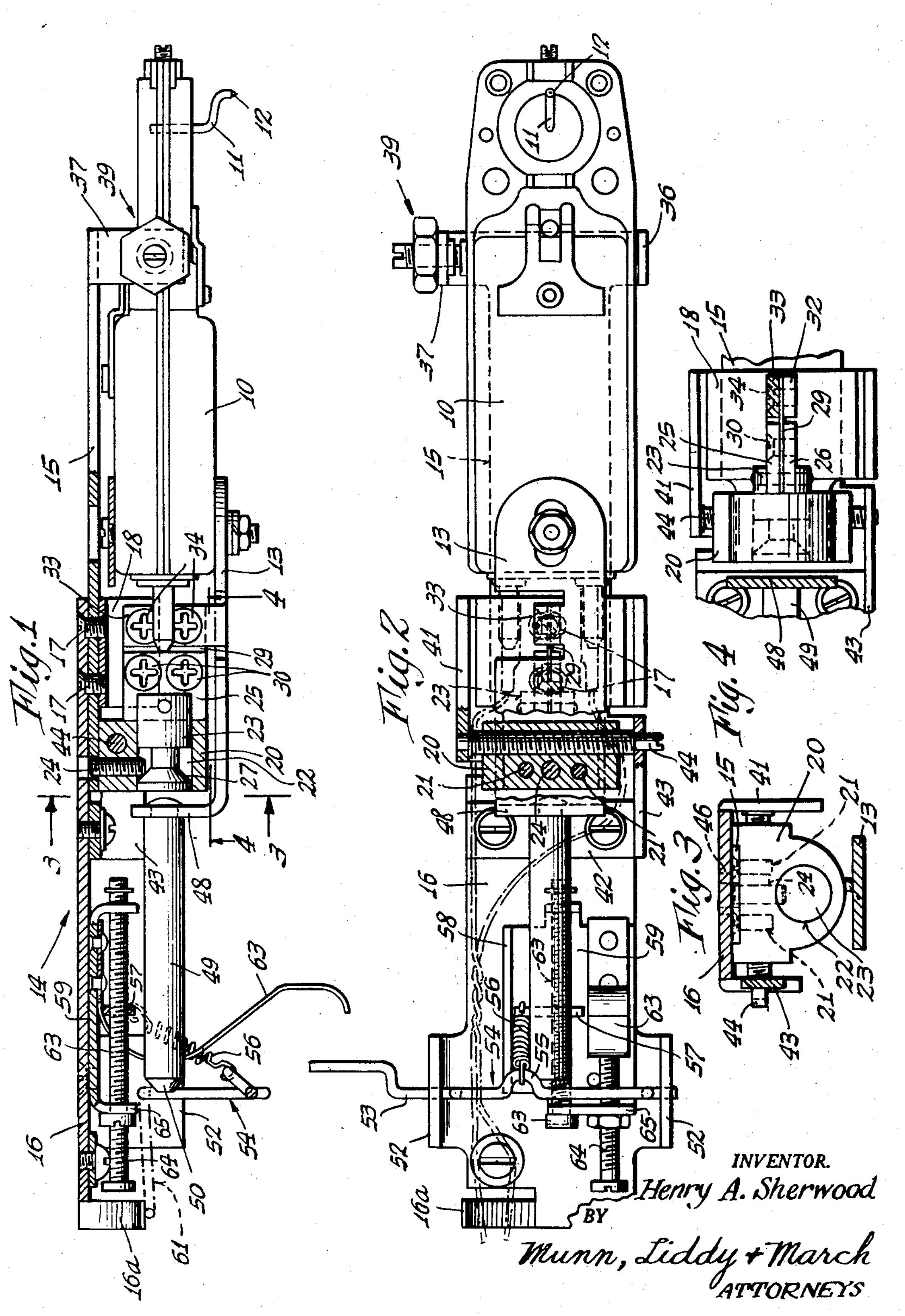
Figure 1 is a view partly in longitudinal, vertical section and partly in side elevation, of an improved tone arm and cartridge organization as provided by the invention.
Figure 2 is a bottom plan view of the tone arm shown in Figure 1, with portions sectioned to reveal further details.
Figure 3 is a transverse vertical sectional view taken on line 3—3 of Figure 1.
Figure 4 is a horizontal fragmentary sectional view taken on line 4—4 of Figure 1.

Referring to Figures 1 and 2, there is shown a cartridge 10 carrying a stylus 11 which extends laterally downward from the cartridge and has a tip 12 suitable for cutting a record, or for reproducing from a record. Such record, for example, may be the familiar type of plastic disk commonly used in dictating machines, although for the purposes of this invention it may have other forms or shapes, such a cylinders, tapes or bands, and the like.

The cartridge 10 is rigidly secured to a mounting strip or cartridge retainer 13 adapted to extend longitudinally of and below the tone arm which is indicated generally by the numeral 14.

As shown in Figure 1, the tone arm 14 may comprise two main, aligned parts or components, 15 and 16 in the shape of elongate members or strips secured together at one set of adjoining ends. I term the component 15 a cartridge chassis, and the component 16 a cartridge chassis retainer, and the latter may overlie or overlap the cartridge chassis 15 and be secured thereto, as by screws 17 threaded into a nut plate 18.

In accordance with this invention I provide, in conjunction with the cartridge retainer 13 a novel means for mounting the cartridge 10 on the tone arm 14 to enable the cartridge to occupy different adjusted positions wherein the stylus 11 is presented at different lateral angles with respect to the tone arm.

In accomplishing this, I provide on the underside of the tone arm 14 a mounting block or bridge retainer 20 which is secured to the cartridge chassis 15 by screws 21, Figures 2 and 3. The bridge retainer 20 has a large circular bore 22 in which there is accommodated a stout pivot pin or swivel 23, also termed herein a stub shaft. I mount the cartridge retainer 13 on the swivel 23, thereby to enable the cartridge retainer and the cartridge 10 to have a limited turning movement about the axis of the swivel when the latter is turned in the bridge retainer 20. Thus I am enabled to place the cartridge 10 and the stylus 11 in different angular positions about an axis extending longitudinally of the tone arm 14, so as to change the depending angular position of stylus 11, enabling it to make various small acute angles with respect to the vertical. The cartridge 10, stylus 11 and retainer 13 may be locked in different angular positions by a set screw 24, Figures 1–3, threaded into the block or bridge retainer 20, as shown. The swivel 23 has secured to it a pair of flat clamping plates or spring retainers 25, 26, Figure 4, and the left-most edges or ends of said plates (as viewed in Figure 1) are adapted to abut the bridge retainer 20 and to be forcibly held thereagainst upon tightening of the set screw 24, since the swivel 23 is provided with a beveled portion 27 adapted to be engaged by the tip of the said screw. Thus, a secure locking action is obtained upon tightening the screw.

I have found that, by the provision of such swivel mounting and by adjusting the angularity of the stylus 11 with respect to the vertical, it is possible to counteract the various tangential forces of different magnitude encountered by the tone arm 14 during its traversal of a record disk, and to thereby obtain a reliable and effective tracking of the stylus 11 during the playback operation. The cartridge behavior when it is traversing any part of the disk may therefore be controlled, and the cartridge may be made to have a tendency to travel toward the inside or toward the outside of the disk, depending on the angle at which it is set, i. e., the angle which the stylus makes with a vertical longitudinal plane of the tone arm.

Further, in accordance with the present invention, I provide an effective and reliable yet greatly simplified and economical-to-produce support or mounting for effecting lateral compliance of the cartridge 10, in connection with the swivel 23 and the cartridge retainer 13. In accomplishing this, there is interposed between the clamping plates 25 and 26 a flat spring 29 constituting a hinge connection; said spring being secured in place by screws 30 and also being clamped between a nut plate 32 and a tab 33 integral with and extending upward from the cartridge retainer member 13. Securement is effected by screws 34, as shown.

It will be seen that the flat spring 29 not only provides for hingedly connecting the cartridge 10 to the swivel 23 but also provides a bias whenever the cartridge is swung out of its normal position. Hereinafter, where I employ the term "hinge connection" or "hinge means" for such connection it is intended that this embrace not only the usual hinge having two bearing plates and a pintle, but also similar or equivalent structures including flat or leaf springs, yieldable connections, rubber mountings and the like.

With this construction it will now be observed that the cartridge retainer 13 and cartridge 10 may have limited angular movement about a vertical axis disposed in or adjacent the free or effective intermediate portion of the flat spring or support 29. Such lateral movement is limited by depending arms 36 and 37 provided on the cartridge chassis 15, one of said arms having an adjustable screw stop 39 engaged with the cartridge to limit unidirectional movement thereof (upward movement as viewed in Figure 2). As will be more fully disclosed hereinafter, the cartridge 10 is maintained against the stop 39 during cutting of a record, and accordingly the exact cutting position of the cartridge in the tone arm 14 may be accurately predetermined and preset.

Further, in accordance with the present invention, I provide in conjunction with the above swivel mounting, and in conjunction with the mounting for obtaining lateral compliance an adjustment device or means for changing the lateral position of the cartridge 10 and cartridge chassis 15, within certain limits with respect to the cartridge chassis retainer 16. In accomplishing this, the retainer 16 is provided with a depending flange 41 and with a bearing plate 42 having a depending flange 43, both said flanges being apertured and accommodating a lateral adjusting screw 44 which is threaded into the bridge retainer block 20. Also, the holes for the fastening screws 17 are made elongate or in the form of slots (indicated at 46 in Figure 3), and upon such screws being loosened, turning of the adjusting screw 44 will shift the cartridge chassis 15, bridge retainer 20, swivel 23, cartridge retainer 13 and cartridge 10 laterally one way or the other with respect to the chassis retainer 16. When the desired adjustment has been obtained, the screws 17 may again be tightened thereby locking the adjusted assemblage to the chassis retainer 16.

Moreover, in accordance with this invention, I provide a novel control or shifting means in conjunction with the swivel mounting 20, 23 whereby lateral compliance may be abolished from the cartridge 10 during cutting of a record regardless of the angularity of the cartridge and the stylus 11. Referring to Figures 2 and 3, in providing such shifting means the cartridge retainer 13 has an upstanding tab 48 to which there is secured an operator member in the form of a rod extension 49 terminating in a reduced point 50. The rod extension 49 is so arranged as to be accurately aligned with the swivel 23 whereby it will have only rotative or turning movement and no translational movement upon adjustment of the said swivel. I provide on the chassis retainer 16 a pair of depending ears 52 provided with apertures through which a tone arm release member or wire 53 passes, said wire having an offset portion 54 provided with a U-bend 55 engaging one end of a helical extension spring 56 the other end of which is attached to a spring holder or lug 57. The spring 56 extends, for one position of the wire 53, between the rod extension 49 and a depending flange 58 of a spring bracket 59 secured to the underside of the chassis retainer 16. The flange 58 constitutes an abutment or backing for one side of the spring 56, and the latter when positioned as shown maintains the rod extension 49 in a down-swung position as viewed in Figure 2, thereby holding the cartridge 10 in an upswung position and against the adjustable stop 39. Thus the cartridge 10 does not have lateral compliance but instead is rigid with respect to the chassis retainer 16, for the purpose of cutting, or recording on, a record disk. Upon the tone arm release wire 53 being swung to playback position indicated by the broken lines at 61 in Figure 1, the spring 56 will no longer be engaged with the rod extension 49, and the latter and cartridge retainer 13 and cartridge 10 will be free for limited lateral movement, constituting lateral compliance for playback purposes.

The playback position of the wire 53, as indicated at 61, is determined by a tab 16*a* integral with the chassis retainer 16, such tab being readily bendable for adjustment purposes, to vary the said playback position. Adjustment of the tension of the spring 56 is effected by mounting the spring holder 57 on an adjusting screw 63 which is carried by the spring bracket 59. It will be understood that the control effected by the spring 56 to eliminate lateral compliance will not be affected due to placing the cartridge 10 in different angular positions by means of the swivel 23, since the rod extension 49 is cylindrical and is closely aligned with the swivel for all practical purposes, considering the small angular adjustment which the swivel provides.

The spring bracket 59 mounts a playback leaf spring 63 by which a bias may be imparted to the tone arm 14, any adjustment of such bias is provided for through the use of an adjusting screw 64 engaging the spring 63 and threaded into a flange 65 on the spring bracket 59.

It will be readily understood that, in accordance with the above construction, I have provided a novel and improved tone arm and cartridge assembly by which improved tracking of the record is obtained during playback, through control of the angularity of the cartridge and stylus carried thereby. Moreover, I provide an improved and simplified, less expensive mounting for effecting lateral compliance in conjunction with such angular positioning of the cartridge and stylus, and provide novel and advantageous adjustment means by which the various components of the assemblage may be initially correlated with each other to render the assemblage an operative entity.

Variations and modifications may be made within the scope of the claims, and portions of the improvements may be used without others.

I claim:

1. In sound equipment, a tone arm mounted for lateral movement; a transducer cartridge having a stylus depending therefrom; means adjustably mounting said cartridge on the tone arm, said mounting means enabling the cartridge to occupy different adjusted positions wherein the stylus is presented at different lateral angles with respect to the tone arm, said means which adjustably mounts the cartridge comprising a bearing carried by the tone arm and having its axis extending longitudinally of the arm, and further comprising a swivel member secured to the cartridge and movable in said bearing, said swivel member comprising a turnable and longitudinally movable stub shaft having a conical surface and having a shoulder facing longitudinally thereof and engageable with said bearing; and locking means engageable with said conical surface, for forcing the shaft in an axial direction with the shoulder thereof engaged with the bearing, thereby to hold the shaft in different rotative positions.

2. In sound equipment, a tone arm mounted for lateral movement; a transducer cartridge having a stylus depending therefrom; means adjustably mounting said cartridge on the tone arm, said mounting means enabling the cartridge to occupy different adjusted positions wherein the stylus is presented at different lateral angles with respect to the tone arm, said means which adjustably mounts the cartridge comprising a bearing carried by the tone arm and having its axis extending longitudinally of the arm, and further comprising a swivel member secured to the cartridge and movable in said bearing, said swivel member comprising a turntable and longitudinally movable stub shaft having a conical surface, and having a shoulder facing longitudinally thereof and engageable with said bearing; and locking means engageable with said conical surface, for forcing the shaft in an axial direction with the shoulder thereof engaged with the bearing, thereby to hold the shaft in different rotative positions, said swivel member being disposed at one end of the cartridge, substantially in axial alignment therewith, and said shoulder comprising a flexible plate carrying the said cartridge.

3. In sound equipment, a tone arm mounted for lateral movement; a transducer cartridge having a stylus depending therefrom; means adjustably mounting said cartridge on the tone arm, said mounting means enabling the cartridge to occupy different adjusted positions wherein the stylus is presented at different lateral angles with respect to the tone arm, said means which adjustably mounts the cartridge comprising a bearing carried by the tone arm and having its axis extending longitudinally of the arm, and further comprising a swivel member secured to the cartridge and movable in said bearing, said swivel member comprising a turnable and longitudinally movable stub shaft having a conical surface, and having a shoulder facing longitudinally thereof and engageable with said bearing; locking means engageable with said conical surface, for forcing the shaft in an axial direction with the shoulder thereof engaged with the bearing, thereby to hold the shaft in different rotative positions, said swivel member being disposed at one end of the cartridge, substantially in axial alignment therewith, said shoulder comprising a flexible plate carrying the said cartridge, and said tone arm comprising two elongate members having juxtaposed ends secured together, one of said members carrying the said bearing and the other carrying said cartridge; and means for adjustably positioning one member laterally with respect to the other whereby the said members may be adjustably shifted with translational movement.

4. In sound equipment, a tone arm mounted for lateral movement; a transducer cartridge having a stylus depending therefrom; means adjustably mounting said cartridge on the tone arm, said mounting means enabling the cartridge to occupy different adjusted positions wherein the stylus is presented at different lateral angles with respect to the tone arm, said mounting means including an adjustment device enabling the cartridge to be shifted with translational movement in a direction laterally of its longitudinal axis and of the said stylus.

5. In sound equipment, a tone arm mounted for lateral movement; a transducer cartridge having a stylus depending therefrom; means adjustably mounting said cartridge on the tone arm, said mounting means enabling the cartridge to occupy different adjusted positions wherein the stylus is presented at different lateral angles with respect to the tone arm, said mounting means including an adjustment device enabling the cartridge to be shifted with translational movement in a direction laterally of its longitudinal axis and of the said stylus, said mounting means further including a block carried by the tone arm and said adjustment device comprising means for shifting the said block with translational movement laterally on the tone arm.

6. In sound equipment, a tone arm mounted for lateral movement; a transducer cartridge having a stylus depending therefrom; means adjustably mounting said cartridge on the tone arm, said mounting means enabling the cartridge to occupy different adjusted positions wherein the stylus is presented at different lateral angles with respect to the tone arm, said mounting means including an adjustment device enabling the cartridge to be shifted with translational movement in the direction laterally of its longitudinal axis and of the said stylus, said means which adjustably mounts the cartridge carrying a support having abutments enabling the cartridge to have limited lateral shifting movement for the purpose of effecting lateral compliance of the cartridge.

7. In sound equipment, a tone arm mounted for lateral movement; a transducer cartridge having a stylus depending therefrom; means adjustably mounting said cartridge on the tone arm, said arm mounting means enabling the cartridge to occupy different adjusted positions wherein the stylus is presented at different lateral angles with respect to the tone arm, said means which adjustably mounts the cartridge carrying a support enabling the cartridge to have limited lateral shifting movement for the purpose of effecting lateral compliance of the cartridge, and comprising a bearing block secured to the tone arm and having a bore extending longitudinally of the arm, comprising a swivel member carried in said bore and turnable therein, the said support comprising a leaf spring connected to said swivel member and to the cartridge to provide for limited relative angular movement therebetween.

8. In sound equipment, a tone arm mounted for lateral movement; a transducer cartridge having a stylus depending therefrom; means adjustably mounting said cartridge on the tone arm, said arm mounting means enabling the cartridge to occupy different adjusted positions wherein the stylus is presented at different lateral angles with respect to the tone arm, said means which adjustably mounts the cartridge carrying a support enabling the cartridge to have limited lateral shifting movement for the purpose of effecting lateral compliance of the cartridge, and comprising a bearing block secured to the tone arm and having a bore extending longitudinally of the arm, comprising a swivel member carried in said bore and turnable therein, the said support comprising a leaf spring connected to said swivel member and to the cartridge to provide for limited relative angular movement therebetween, said swivel member comprising a stub shaft having a shoulder engaging the bearing block and having a conical locking surface; a set screw carried by the bearing block and engageable with the conical surface of the shaft to lock the latter in the block, said screw forcing the shoulder of the shaft against the bearing block during such locking.

9. In sound equipment, a tone arm mounted for lateral movement; a transducer cartridge having a stylus depending therefrom; means adjustably mounting said cartridge on the tone arm, said mounting means enabling the cartridge to occupy different adjusted positions wherein the stylus is presented at different lateral angles with respect to the tone arm, said means which adjustably mounts the cartridge carrying a support enabling the cartridge to have limited lateral shifting movement for the purpose of effecting lateral compliance of the cartridge; a stop on the tone arm, adapted to be engaged by the cartridge when the latter is unidirectionally shifted; shifting means including a member movably mounted on the tone arm, for effecting such unidirectional shifting, said shifting means being operable for different adjusted angular positions of the cartridge.

10. In sound equipment, a tone arm mounted for lateral movement; a transducer cartridge having a stylus depending therefrom; means adjustably mounting said cartridge on the tone arm, said mounting means enabling the cartridge to occupy different adjusted positions wherein the stylus is presented at different lateral angles with respect to the tone arm, said means which adjustably mounts the cartridge carrying a support enabling the cartridge to have limited lateral shifting movement for the purpose of effecting lateral compliance of the cartridge; a stop on the tone arm, adapted to be engaged by the cartridge when the latter is unidirectionally shifted; shifting means including a member movably mounted on the tone arm, for effecting such unidirectional shifting, said shifting means being operable for different adjusted angular positions of the cartridge and comprising an elongate operator rigidly secured to the cartridge substantially in alignment with the axis thereof; and a spring movably carried by the tone arm and movable into and out of engagement with said operator to displace the latter.

11. In sound equipment, a tone arm mounted for lateral movement; a transducer cartridge having a stylus depending therefrom; means adjustably mounting said cartridge on the tone arm, said mounting means enabling the cartridge to occupy different adjusted positions wherein the stylus is presented at different lateral angles with respect to the tone arm, said means which adjustably mounts the cartridge carrying a support enabling the cartridge to have limited lateral shifting movement for the purpose of effecting lateral compliance of the cartridge; a stop on the tone arm, adapted to be engaged by the cartridge when the latter is unidirectionally shifted; shifting means including a member movably mounted on the tone arm, for effecting such unidirectional shifting, said shifting means being operable for different adjusted angular positions of the cartridge and comprising an elongate operator rigidly secured to the cartridge substantially in alignment with the axis thereof; a spring movably carried by the tone arm and movable into and out of engagement with said operator to displace the latter, said means which adjustably mounts the cartridge further comprising a bearing carried by the tone arm and a swivel member turnable in said bearing and connected with the cartridge, said bearing and swivel member being disposed between the cartridge and said elongate operator.

12. In sound equipment, a tone arm mounted for lateral movement; a transducer cartridge having a stylus depending therefrom; means adjustably mounting said cartridge on the tone arm, said mounting means enabling the cartridge to occupy different adjusted positions wherein the stylus is presented at different lateral angles with respect to the tone arm, said means which adjustably mounts the cartridge carrying a support enabling the cartridge to have limited lateral shifting movement for the purpose of effecting lateral compliance of the cartridge; a stop on the tone arm, adapted to be engaged by the cartridge when the latter is unidirectionally shifted; shifting means including a member movably mounted on the tone arm, for effecting such unidirectional shifting, said shifting means being operable for different adjusted angular positions of the cartridge and comprising an elongate operator rigidly secured to the cartridge substantially in alignment with the axis thereof; and a spring movably carried by the tone arm and movable into and out of engagement with said operator to displace the latter, said operator comprising a round bar having a free end of reduced diameter adapted to be engaged by the said spring.

References Cited in the file of this patent

UNITED STATES PATENTS

| | | |
|---|---|---|
| 2,525,968 | Somers | Oct. 17, 1950 |
| 2,572,495 | LaForest | Oct. 23, 1951 |
| 2,601,126 | Palo | June 17, 1952 |
| 2,776,144 | Nichols | Jan. 1, 1957 |